HIGH SPEED, HIGH DENSITY OPTICAL RECORDING SYSTEM

Filed Oct. 26, 1962 2 Sheets-Sheet 1

INVENTOR:
Wayne R. Johnson
By Keith D. Beecher
Attorney

Oct. 27, 1964 W. R. JOHNSON 3,154,370

HIGH SPEED, HIGH DENSITY OPTICAL RECORDING SYSTEM

Filed Oct. 26, 1962 2 Sheets-Sheet 2

INVENTOR:
Wayne R. Johnson
By Keith D. Beecher
Attorney 3,154,370
Patented Oct. 27, 1964

3,154,370

HIGH SPEED, HIGH DENSITY OPTICAL RECORDING SYSTEM

Wayne R. Johnson, Los Angeles, Calif., assignor to Winston Research Corporation, Los Angeles, Calif., a corporation of California Filed Oct. 26, 1962, Ser. No. 233,248
7 Claims. (Cl. 346—108)

The present invention relates to optical recording, and it relates more particularly to an improved optical recording system of the high-speed, high-density type.

The present invention relates particularly to an improved optical recording system which utilizes a high-intensity light source, such as a laser, and by which information is recorded in a spiral track on a photo-sensitive recording medium, such as a suitably coated wire.

The improved optical recording system of the invention, in the embodiment to be described, is of the variable density type. That is, the optical recording system to be described is of the general type in which light from a suitable source is passed through a light modulator and is subsequently focused onto the recording medium; and in which the light passed by the modulator is intensity-modulated in accordance with the modulations of a signal applied to the modulator.

It will become evident as the description proceeds, however, that the invention is not limited to any particular type of modulating system; nor is the invention limited to any paricular type of modulated or unmodulated signal.

The optical recording system of the invention is particularly suited for the recording of television signals and the like, in that it exhibits capabilities for handling without distortion signals, modulated or unmodulated, extending through a range of 0 to 20 megacycles. In the embodiment to be described, such signals are assumed to frequency modulate a 40 megacycle carrier for example.

The limited intensity of the light sources usually used in the prior art optical recording system has limited the capacities and capabilities of such prior art systems. However, the recent advent of the laser light amplifier, in conjunction with other components of the improved combination to be described, results in the provision of an improved and unique optical recording system which has high density and high speed capabilities and which is capable of recording signals extending through a wide frequency range.

Laser light sources serve to amplify light and to radiate the amplified light in the form of a coherent, extremely high intensity light beam of a very sharp frequency. Descriptions of the laser, or optical maser as it is sometimes called, may be found, for example, in the following articles: Physical Review Letters, volume 7, No. 12, December 15, 1961, in an article by E. Snitzer, this being a publication of the American Physical Society; Physical Review, 112, 1940 (1958) A. L. Schawlow et al.; Nature, 187, 493 (1960), T. H. Maiman; Physical Review Letters, 5, 557 (1960), P. O. Sorokin and M. J. Stevenson; Physical Review Letters, 6, 95 (1961) I. Wieder and L. R. Sarles.

An object of the present invention, therefore, is to provide an improved optical recording and storage system which utilizes a high intensity light source, such as a laser, so as to achieve high-speed, high-density recording characteristics.

Another object is to provide such an improved optical recording and storage system which is capable of recording signals extending through a wide frequency range on a suitable coated wire with relatively high recording density and at a relatively high speed as compared with the prior art optical recording systems of the same general type.

Another object is to provide an improved high-speed, high-density optical recording system which is relatively simple to construct and which uses readily available and inexpensive component parts.

Other objects and advantages of the invention will become apparent from a consideration of the following description, when taken in conjunction with the accompanying drawings, in which.

Figure 1:
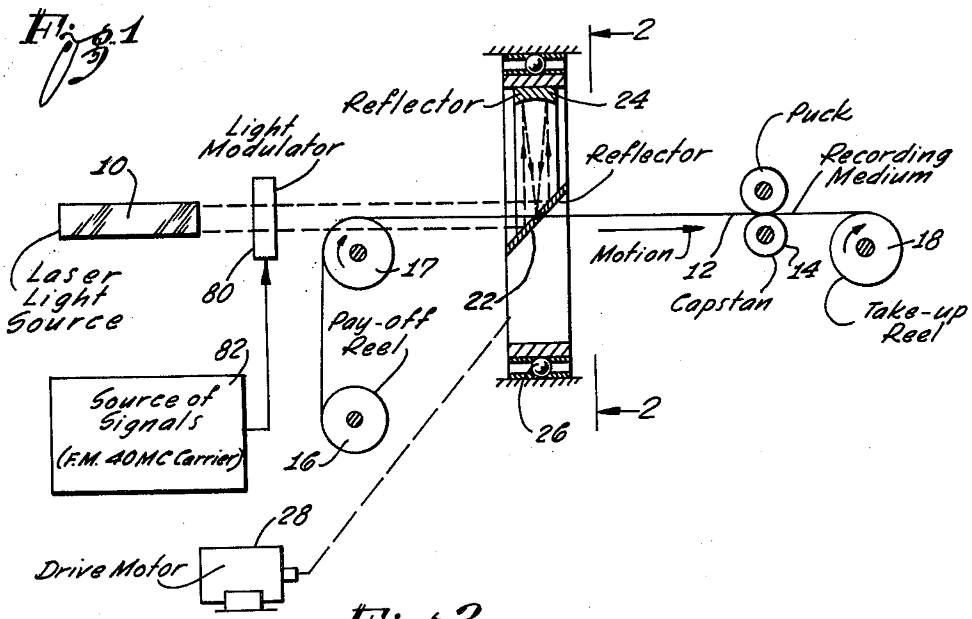
FIGURE 1 is a schematic representation of an optical recording system constructed in accordance with one embodiment of the invention.
Figure 2:
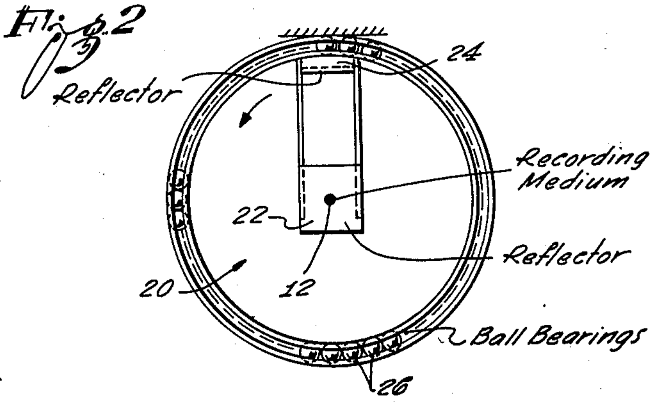
FIGURE 2 is a side view of a component of the system of FIGURE 1, taken substantially along the line 2—2 of FIGURE 1.

The recording system of FIGURE 1 includes a laser light source 10 which is constructed in any known manner and which is positioned to direct a laser light beam along a particular path. An electrically conductive wire-like recording medium 12 is drawn along the particular path by means of a capstan 14. The recording medium has a suitable light-sensitive emulsion coating on its outer surface, and this coating responds to incident light to vary the reflective characteristics of the recording medium in a manner known to the art.

The drive capstan 14 draws the recording medium 12 off a pay-off reel 16, and the recording medium is wound onto a take-up reel 18. The reels 16 and 18 are driven and controlled by usual electro-magnetic drive and braking mechanisms. As shown in FIGURE 1, the recording medium is drawn over a usual idler 17.

A rotatable reflecting assembly 20 is mounted for rotation about an axis coaxial with the path along which the recording medium 12 is drawn. This rotatable reflecting assembly 20 may be similar to the rotatable members and assemblies described, for example, in an article in Scientific American, for April 1961, page 135, the article being entitled "Ultra High Speed Rotation" by Jesse W. Beams.

The reflecting assembly 20 includes a reflector 22 which has a central aperture through which the recording medium is drawn. The reflector 22 is disposed, for example, at an angle of 45° to the path of the recording medium 12. The reflector intercepts the light beam from the laser 10 and reflects the light beam to a second reflector 24 in the reflecting assembly 20, the reflector 24 having a concave surface.

The reflector 24 is disposed radially outwardly from the axis of rotation of the reflecting assembly 20, and it serves to reflect the light from the reflector 22 back towards the path of the recording medium 12 and onto the surface of the medium 12. It is apparent that as the medium 12 is drawn along the rectilinear path, and as the rotating reflecting assembly 20 is rotatably driven at a high speed, the reflected light from the reflector 24 is caused to progress along a spiral track on the recording medium.

Figure 3:
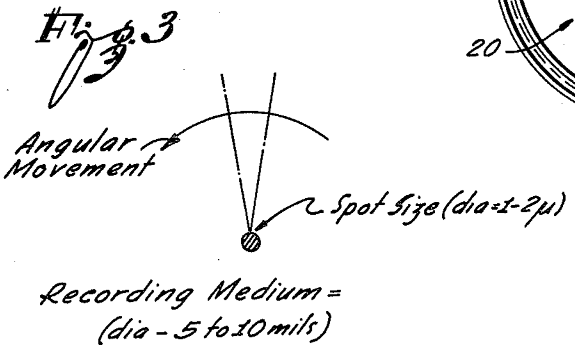
FIGURE 3 is a diagrammatic representation of the recording medium in the system of FIGURE 1 and the manner in which light is focused onto the surface of the recording medium.

The reflector 24 has a concave surface configuration, so that the reflected light may be focused to an extremely small spot (FIGURE 3) on the surface of the recording medium. As indicated in FIGURE 3, the diameter of the recording medium may be of the order of 5–10 mils; and the diameter of the light spot focused on the surface of the recording medium may be of the order of 1–2 microns.

The reflecting assembly 20 is mounted for rotation about the aforementioned axis by means of appropriate ball bearings, indicated diagrammatically as 26. The assembly is rotatably driven by a drive motor 28 which is mechanically coupled to the assembly, as indicated in FIGURE 1.

Figures 4, 5, 6:
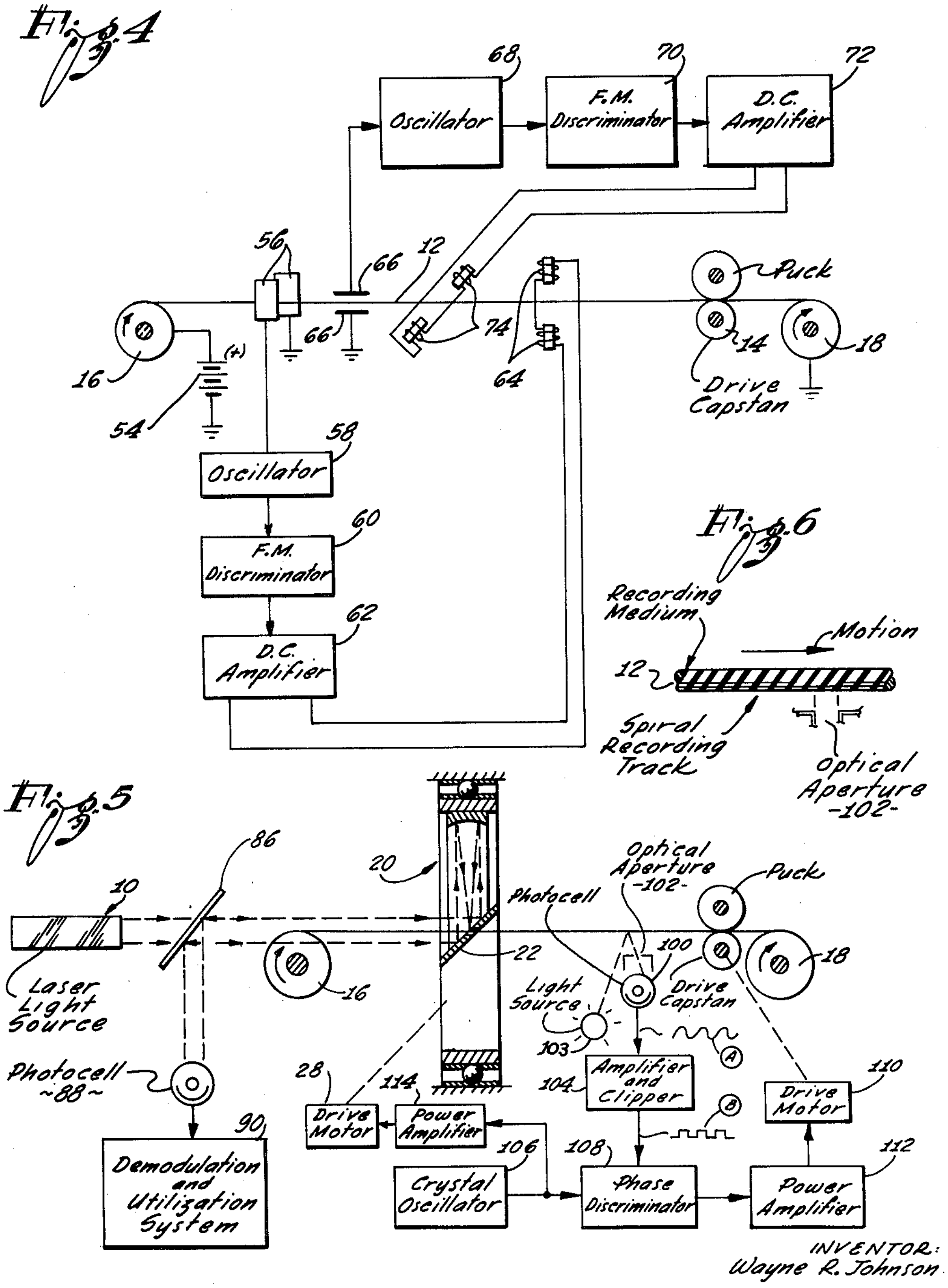
FIGURE 4 is a schematic block diagram of a centering control for maintaining the recording medium in the system of FIGURE 1 on a particular rectilinear path.
FIGURE 5 is a schematic representation of a system for reproducing intelligence recorded on a recording medium by a system, such as the system of FIGURE 1.
FIGURE 6 is a schematic representation of the manner in which information is recorded on the recording medium, so as to enable a speed control signal to be derived therefrom.

The recording medium 12 may be centered as it is drawn through the aperture in the reflector 22, and this centering of the recording medium on the optical path may be maintained by the control system shown in block and schematic form in FIGURE 4.

One end of the recording medium 12 is connected to the reel 18, which is grounded, as shown, the other end of the recording medium 12 is connected to the reel 16. The positive terminal of a source of potential 54 is connected to the reel 16 and the negative terminal of the source 54 is grounded. This source produces a potential difference along the recording medium 12, so that an electric current flows through the recording medium.

A first pair of electrodes, in the form of a pair of electrostatic plates 56 are disposed horizontally on opposite sides of the recording medium 12. One of the plates 56 is grounded, and the other is connected to an oscillator 58. The oscillator 58 is coupled to a frequency modulation discriminator 60 which, in turn, is coupled to a direct current amplifier 62. The direct current amplifier 62 is connected to a pair of electrodes 64. These latter electrodes are illustrated as having the form of a pair of magnetic deflection coils vertically disposed on opposite sides of the recording medium 12.

A further pair of electrostatic plates 66 are disposed vertically on opposite sides of the recording medium 12, the plates 66 being disposed adjacent the plates 56, as shown. One of the plates 66 is grounded, and the other is coupled to an oscillator 68.

The oscillator 68 is coupled to a frequency modulation discriminator 70 which, in turn, is coupled to a direct current amplifier 72. The direct current amplifier 72 is connected to a further pair of electrodes 74. The electrodes 74 have the form of magnetic deflection coils horizontally disposed on opposite sides of the recording medium 12.

The components illustrated in block form in FIGURE 4 are, in themselves, well known to the electrical and electronic art. The circuit details of these components form no part of the present invention, and for that reason, the circuitry of the components will not be described.

The oscillator 58, for example, oscillates at a predetermined frequency, such that the frequency modulation discriminator 60 produces a zero output. However, should the recording medium 12 tend to depart from its central position in a horizontal direction, its resulting approach to or departure from the unground plate 56 causes the frequency of the oscillator 58 to change correspondingly. The change in frequency of the oscillator 58 causes the frequency discriminator 60 to produce a corresponding direct current output signal, and this signal is amplified in the direct current amplifier 62.

The resulting output from the direct current amplifier 62 causes a current to flow in the coils 64 in a direction to produce a compensating horizontal shift in the recording medium 12. Therefore, any tendency for the medium 12 to shift in a horizontal direction from its central position along the rectilinear path is prevented.

In like manner, the plates 66, and the components 68, 70 and 72 produce a corresponding current flow in the coils 74 to inhibit vertical displacements of the recording medium from the central rectilinear path.

The system of FIGURE 4 operates, therefore, to maintain the recording system on its central rectilinear path for passage through the central aperture in the reflector 22 of the system of FIGURE 1.

Appropriate manual controls can be provided in the oscillators 58 and 68 to control the rectilinear path on which the recording medium 12 is to be centered. This adjustment may be carried out, for example, until a uniform noise level is achieved around the recording medium 12. In this manner the effects of random noise on the recording medium may be reduced to a minimum.

A light modulator 80 of any appropriate, known construction is interposed in the system of FIGURE 1 in the light beam from the laser light source 10, between the source and the reflector 22. A modulated carrier, or video signals, for example, are introduced to the light modulator 80 from an appropriate source 82. These signals in the particular embodiment under consideration cause the light modulator 80 to intensity modulate the laser beam. The resulting intensity modulated beam is reflected from the reflector 22 onto the reflector 24, and the beam is again reflected by the reflector 24 to a point focus (FIGURE 3) on the surface of the light-sensitive wire-like recording medium 12.

This action results in a spiral recording appearing on the surface of the medium 12 as the reflecting assembly 20 is rotated and as the recording medium is drawn along its rectilinear path.

The extremely small size of the spot permits a high density recording to be achieved; and the high intensity of the laser light source 10 permits the recording to be made at an extremely high speed for the recording of high signal frequencies extending through a broad frequency range.

The recording on the recording medium 12 may be reproduced by a reproducing system, such as the system shown in FIGURE 5. In the system of FIGURE 5, many of the components are similar to those described above in conjunction with the system of FIGURE 1, and such components are designated by the same numerals.

In the reproducing system of FIGURE 5, the laser light source 10 directs its laser beam onto the reflector 22 in the rotating reflecting assembly 20. The reflector 22 causes the beam to be reflected to the concave reflector 24 which, as before, causes the light beam to be reflected down on the surface of the recording medium 12 with a sharp spot focus.

In the reproducing system of FIGURE 5, the recording medium 12 reflects the incident light with an intensity proportional to the recordings thereon in the aforementioned spiral track. These latter reflections are again reflected by the reflector 22 back along the rectilinear path of the recording medium 12 to a further reflector 86.

The reflector 86 is disposed in the path of the light beam from the laser 10. The reflector 86 exhibits known optical characteristics in that it permits the passage of the laser light beam from the left to the right in FIGURE 5. However, the reflector 86 serves to reflect the return reflections from the right to the left in FIGURE 5, and these latter reflections are reflected down to an appropritae photo-cell 88. The photo-cell 88 responds to the reflections from the reflector 86 to produce electrical signals corresponding to the recordings on the recording medium 12. These electrical signals are transformed into useable information in a demodulation and utilization system indicated by the block 90.

It is evident that for proper reproduction in the system of FIGURE 5, it is essential that the wire 12 be driven at a speed such that the light reflected by the reflector 24 follows along the spiral recording track on the recording medium 12.

An appropriate speed control for the recording medium 12 to achieve the desired registration between the reflected beam from the reflector 24 and the spiral recording track on the recording medium, may be achieved by the control system shown in FIGURE 5.

The control system of FIGURE 5 includes a photo-cell 100 which is disposed adjacent the recording medium 12. An optical aperture 102 is mounted between the photo-cell and the recording medium, and this optical aperture, as shown in FIGURE 6, is broad enough to pass light from the spiral track and the space adjacent the spiral track to the photo-cell.

It will be appreciated that the spiral track will reflect light with a reduced intensity, proportional to the signals recorded in that track, and that the space between the spiral track will reflect light with a reference intensity.

A light source 103 is directed at the recording medium 12 in a manner such that light from the light source may be reflected by the recording medium through the optical aperture 102 to the photo-cell 100. This causes the photo-cell 100 to generate a sine wave signal (A) as the recording medium 12 is drawn past the optical aperture 102. The frequency of this sine wave signal is proportional to the speed of the recording medium.

The sine wave signal A is passed through an amplifier and limiter clipper unit 104, and the unit 104 produces a square wave signal B which has uniform characteristics regardless of the modulation content of the spiral track. A reference crystal oscillator 106 applies a reference signal to a phase discriminator 108, and the signal from the unit 104 is also applied to the phase discriminator. A drive motor 110 drives the capstan 14 at a speed determined by the power applied to the drive motor by a power amplifier 112. The power amplifier 112, in turn, is controlled by the phase discriminator 108.

The drive motor 28 for the rotatable assembly is also driven by the crystal oscillator 106 for synchronizing purposes. The drive motor 28 is so driven through a power amplifier 114.

The speed control system of FIGURE 5, therefore, serves to cause the drive motor 110 to drive the capstan 14 at a predetermined speed. Any variation from this predetermined speed causes a change in the frequency of the sine wave signal A which, in turn, causes a corresponding change in the frequency of the square wave signal B. This change is in a direction to change the speed of the drive capstan so as to maintain the speed of the recording medium at a precisely established rate. This rate is such that the light beam reflected from the mirror 24 is caused to register exactly with the spiral recording track on the recording medium 12, as the reproducing process continues.

The invention provides, therefore, an improved and simple optical recording system. The improved optical recording system is capable of recording high frequency, broadband signals at an extremely high density on a recording medium, such as a wire-like member.

While a particular embodiment of the invention has been shown and described, modifications may be made, and the following claims are intended to cover all such modifications as fall within the spirit and scope of the invention.

What is claimed is:

1. In combination: a laser light source for producing light in the form of a high intensity light beam; means for drawing a light-sensitive filament-type recording medium along a particular rectilinear path; rotatable reflecting means mounted for rotation about an axis coaxial with said path for directing said light beam along a spiral track on said recording medium as said recording medium is drawn along said path; and means mechanically coupled to said rotatable reflecting means for imparting rotatable movement thereto about said axis.

2. In combination: means for drawing a light-sensitive wire-like recording medium along a particular rectilinear path; a laser light source for producing light in the form of a high intensity light beam and for directing said beam along said path; rotatable reflecting means mounted for rotation about an axis coaxial with said path and including a first reflecting member disposed radially outwardly from said medium for directing the light beam along a spiral track on said medium and a second reflecting member disposed across said path for directing said light beam to said first reflecting member; and means mechanically coupled to said rotatable reflecting means for imparting rotatable movement thereto about said axis.

3. The combination defined in claim 2 and which includes optical modulating means disposed in the path of said light beam for modulating the intensity of said beam in response to an applied signal; and means coupled to said modulating means for introducing signals thereto.

4. In combination: means for drawing a light-sensitive wire-like recording member along a particular rectilinear path; means including electrode members disposed adjacent said path for sensing any tendency of said recording member to become radially displaced from said path and for developing compensating signals in response thereto; further means disposed adjacent said path and coupled to said sensing means and responsive to the compensating signals developed by said sensing means for maintaining said recording member on said path; a light source for producing light in the form of a high intensity light beam; and means disposed in the optical path of said light beam for directing said light beam onto the surface of said recording member.

5. In combination: a light source for producing light in the form of a high intensity light beam; means for moving a light-sensitive filament-type recording medium along a particular path; rotatable directing means mounted for rotation about an axis coaxial with said path for directing said light beam along a spiral track on said recording medium to be reflected thereby as said recording medium is drawn along said path; drive means mechanically coupled to said directing means for imparting rotatable movement thereto about said axis; and means for intercepting the reflected light beam from said recording medium.

6. In combination: a light source for producing light in the form of a high intensity light beam; means for moving a light-sensitive filament-type recording medium along a particular path; rotatable reflecting means mounted for rotation about an axis coaxial with said path for directing said light beam along a spiral track on said recording medium to be reflected thereby as said recording medium is drawn along said path; drive means mechanically coupled to said reflecting means for imparting rotatable movement to said reflecting means about said axis; photo-electric means for producing electrical signals in response to applied light; and further reflecting means disposed in the path of the reflected light beam from said recording medium for directing the reflected light beam to said photo-electric means.

7. In combination: a laser light source for producing light in the form of a high intensity light beam; means for drawing a light-sensitive wire-like recording member along a particular rectilinear path; rotatable reflecting means mounted for rotation about an axis coaxial with said path and including a first reflecting member disposed radially outwardly from said medium for directing the light beam along a spiral track on said medium to be reflected thereby as said recording medium is drawn along said path, and a second reflecting member angularly disposed across said path for directing said light beam to said first reflecting member; driving means mechanically coupled to said reflecting means for imparting rotatable movement to said reflecting means about said axis; photo-electric means for producing electrical signals in response to applied light; and futher reflecting means disposed in the path of the reflected light beam from said recording medium for directing the reflected light beam to said photo-electric means.

References Cited in the file of this patent

UNITED STATES PATENTS 2,898,176 McNaney -------------- Aug. 4, 1959